(12) United States Patent
No et al.

(10) Patent No.: US 12,027,135 B2
(45) Date of Patent: Jul. 2, 2024

(54) DISPLAY DEVICE AND CONTROL METHOD THEREFOR

(71) Applicant: HONDA MOTOR CO., LTD., Tokyo (JP)

(72) Inventors: Yuzo No, Tokyo (JP); Takashi Noguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 14 days.

(21) Appl. No.: 17/883,713

(22) Filed: Aug. 9, 2022

(65) Prior Publication Data
US 2023/0072154 A1   Mar. 9, 2023

(30) Foreign Application Priority Data

Sep. 7, 2021   (JP) ................. 2021-145690

(51) Int. Cl.
| | |
|---|---|
| *G09G 5/00* | (2006.01) |
| *B60R 1/22* | (2022.01) |
| *G06T 11/00* | (2006.01) |
| *G09G 5/10* | (2006.01) |
| *H04N 7/18* | (2006.01) |

(52) U.S. Cl.
CPC ............. *G09G 5/003* (2013.01); *B60R 1/22* (2022.01); *G06T 11/00* (2013.01); *G09G 5/10* (2013.01); *H04N 7/181* (2013.01); *G09G 2354/00* (2013.01); *G09G 2360/144* (2013.01); *G09G 2380/10* (2013.01)

(58) Field of Classification Search
CPC ....... G09G 5/003; G09G 5/10; G09G 2354/00; G09G 2360/144; G09G 2380/10; B60R 1/22; G06T 11/00; H04N 7/181
See application file for complete search history.

(56) References Cited

U.S. PATENT DOCUMENTS

| | | | |
|---|---|---|---|
| 11,363,216 B2* | 6/2022 | Sakurai | H04N 5/272 |
| 2010/0079367 A1* | 4/2010 | Yokota | G01D 7/02 |
| | | | 340/461 |
| 2012/0274737 A1* | 11/2012 | Kuboyama | H04N 7/181 |
| | | | 348/E7.001 |
| 2016/0101725 A1* | 4/2016 | Oh | B60K 37/04 |
| | | | 315/77 |

(Continued)

FOREIGN PATENT DOCUMENTS

WO    2019/172167 A1    9/2019

*Primary Examiner* — Yu Chen
(74) *Attorney, Agent, or Firm* — WHDA, LLP

(57) ABSTRACT

A display device mounted on a vehicle includes a display including a first region that displays a first image based on first image information in response to detection of a request for display of a vehicle outside image, and a second region that displays a second image based on second image information. The device receives first image information generated by a first device; receives, from a second device, second image information that is image information of a vehicle outside image; and simultaneously displays the first image and the second image in a case where the first image information is received within a predetermined time after the second image information is received, and displays the second image in a case where the first image information is not received even when the predetermined time elapses.

9 Claims, 8 Drawing Sheets

(56) References Cited

U.S. PATENT DOCUMENTS

| | | | | |
|---|---|---|---|---|
| 2016/0134845 A1* | 5/2016 | Asai | ............. | H04N 23/62 |
| | | | | 348/234 |
| 2018/0091761 A1* | 3/2018 | Noguchi | ............. | H04N 23/63 |
| 2018/0131877 A1* | 5/2018 | Amano | ............. | H04N 23/63 |
| 2018/0336783 A1* | 11/2018 | Kajimoto | ............. | G01C 21/20 |
| 2019/0197327 A1* | 6/2019 | Mangla | ............. | G06T 11/00 |
| 2019/0222820 A1* | 7/2019 | Lee | ............. | B60K 37/02 |
| 2020/0120255 A1* | 4/2020 | Choi | ............. | H04N 23/72 |
| 2020/0404192 A1* | 12/2020 | Sakurai | ............. | H04N 5/272 |
| 2022/0191449 A1* | 6/2022 | Matsubara | ............. | H04N 9/77 |

\* cited by examiner

FIG. 3
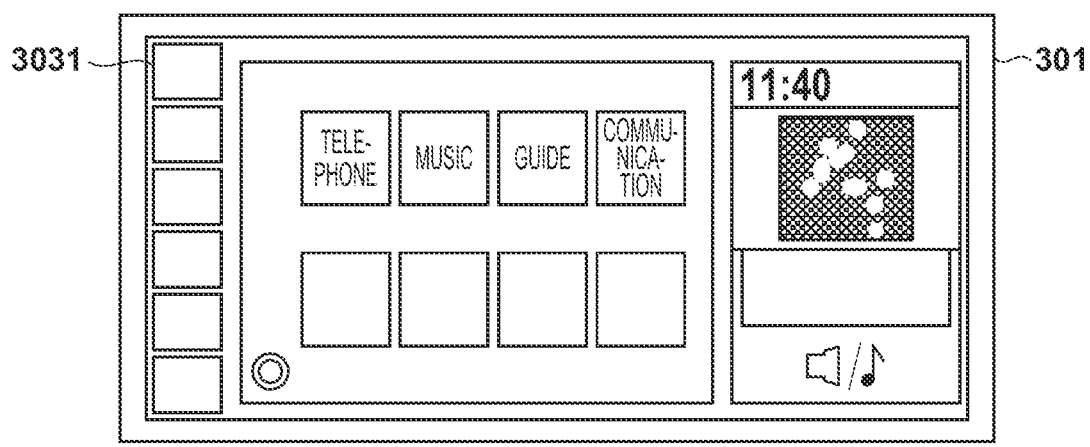
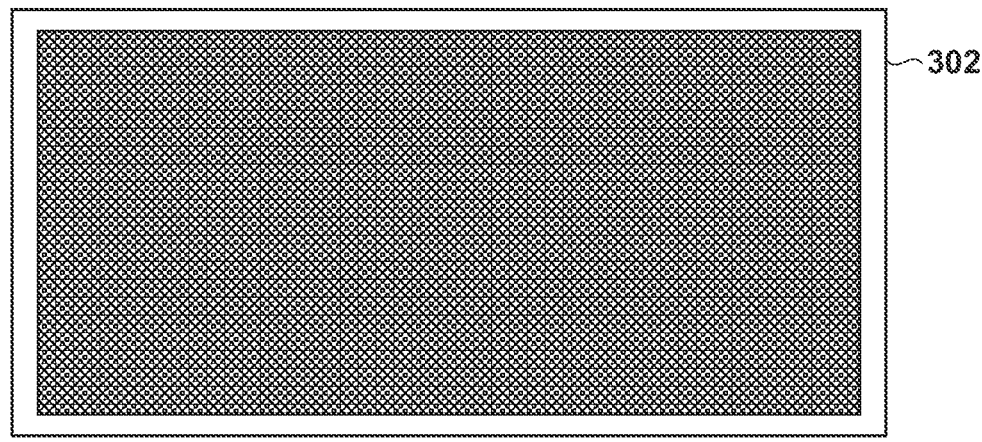
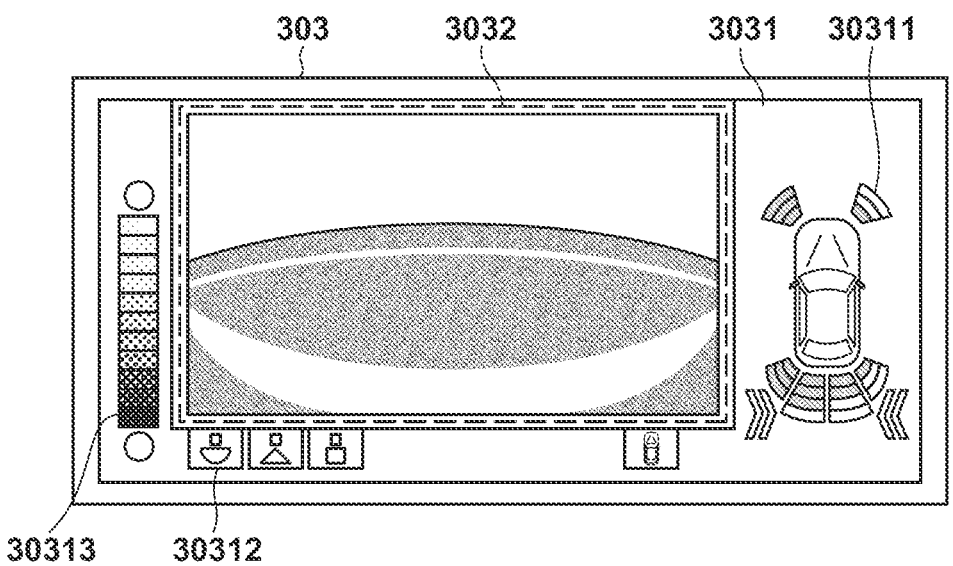

FIG. 4
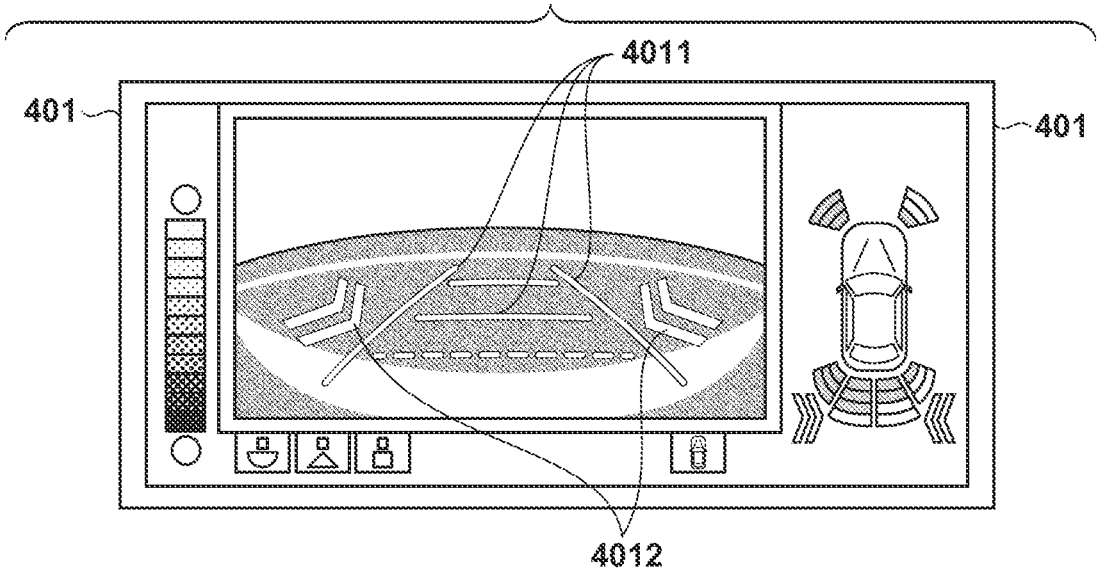
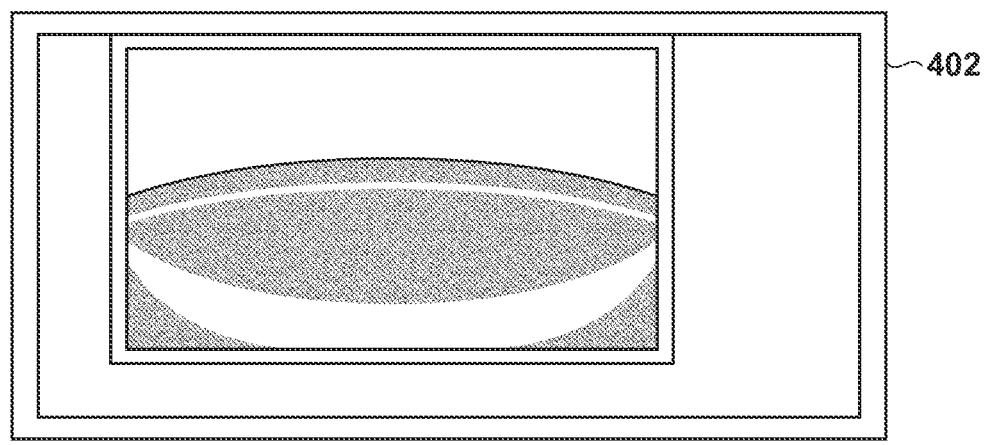
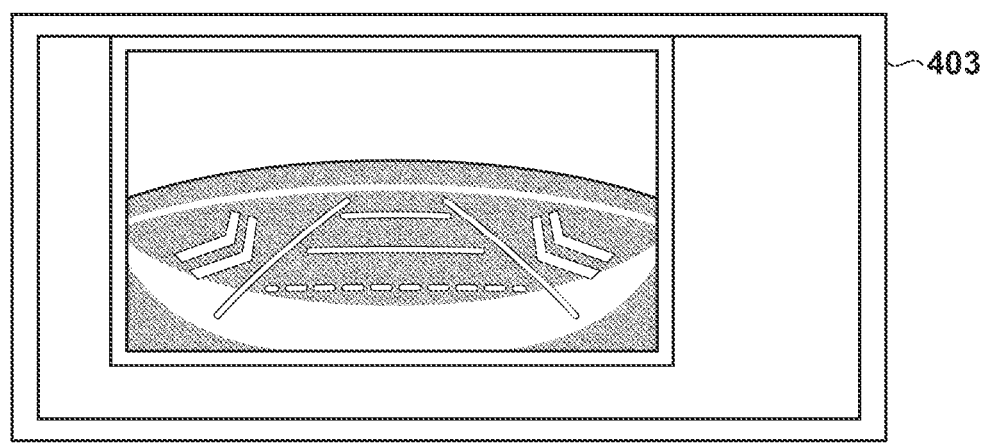

DISPLAY DEVICE AND CONTROL METHOD THEREFOR

CROSS-REFERENCE TO RELATED APPLICATION(S)

This application claims priority to and the benefit of Japanese Patent Application No. 2021-145690 filed on Sep. 7, 2021, the entire disclosure of which is incorporated herein by reference.

BACKGROUND OF THE INVENTION

Field of the Invention

The present invention relates to, for example, a display device mounted on a vehicle or the like, and particularly relates to a display device capable of displaying a video of an outside of the vehicle.

Description of the Related Art

A technology for improving the real-time property of a video by directly inputting a vehicle outside video from a rear camera to a display part provided in front of the driver's seat is disclosed in the International Publication No. 2019/172167, particularly in FIG. 3 thereof. Further, FIG. 6 of the International Publication No. 2019/172167 discloses that, in addition to the vehicle outside video from the rear camera, vehicle information is displayed at a position different from the video.

According to such a conventional technology, while it is possible to quickly display the vehicle outside video from the rear camera, the vehicle outside video and the vehicle information are displayed separately, and there remains a problem in terms of visibility of a user.

SUMMARY OF THE INVENTION

The present invention improves visibility of a user while reliably displaying a vehicle outside image within a predetermined time.

Accordingly, the following configuration is proposed. According to one aspect of the present invention, there is provided a display device mounted on a vehicle, the display device comprising: a first receiver that receives first image information generated by a first device; a second receiver that receives, from a second device, second image information that is image information of a vehicle outside image; a display that displays an image based on image information; at least one processor; and at least one memory that stores at least one program, wherein the display includes a first display region that displays a first image based on the first image information received by the first receiver in response to detection of a request for display of a vehicle outside image, and a second display region that displays a second image based on the second image information received by the second receiver, and the at least one program causes the at least one processor to simultaneously display the first image and the second image in a case where the first image information is received within a predetermined time after the second image information is received, or display the second image in a case where the first image information is not received even when the predetermined time elapses.

According to the above configuration, it is possible to improve the visibility of a user while reliably displaying the vehicle outside image within a predetermined time.

BRIEF DESCRIPTION OF THE DRAWINGS

FIG. 3 is a diagram illustrating a display example by the display unit;
FIG. 4 is a diagram illustrating a display example by the display unit.

DESCRIPTION OF THE EMBODIMENTS

Figure 1:
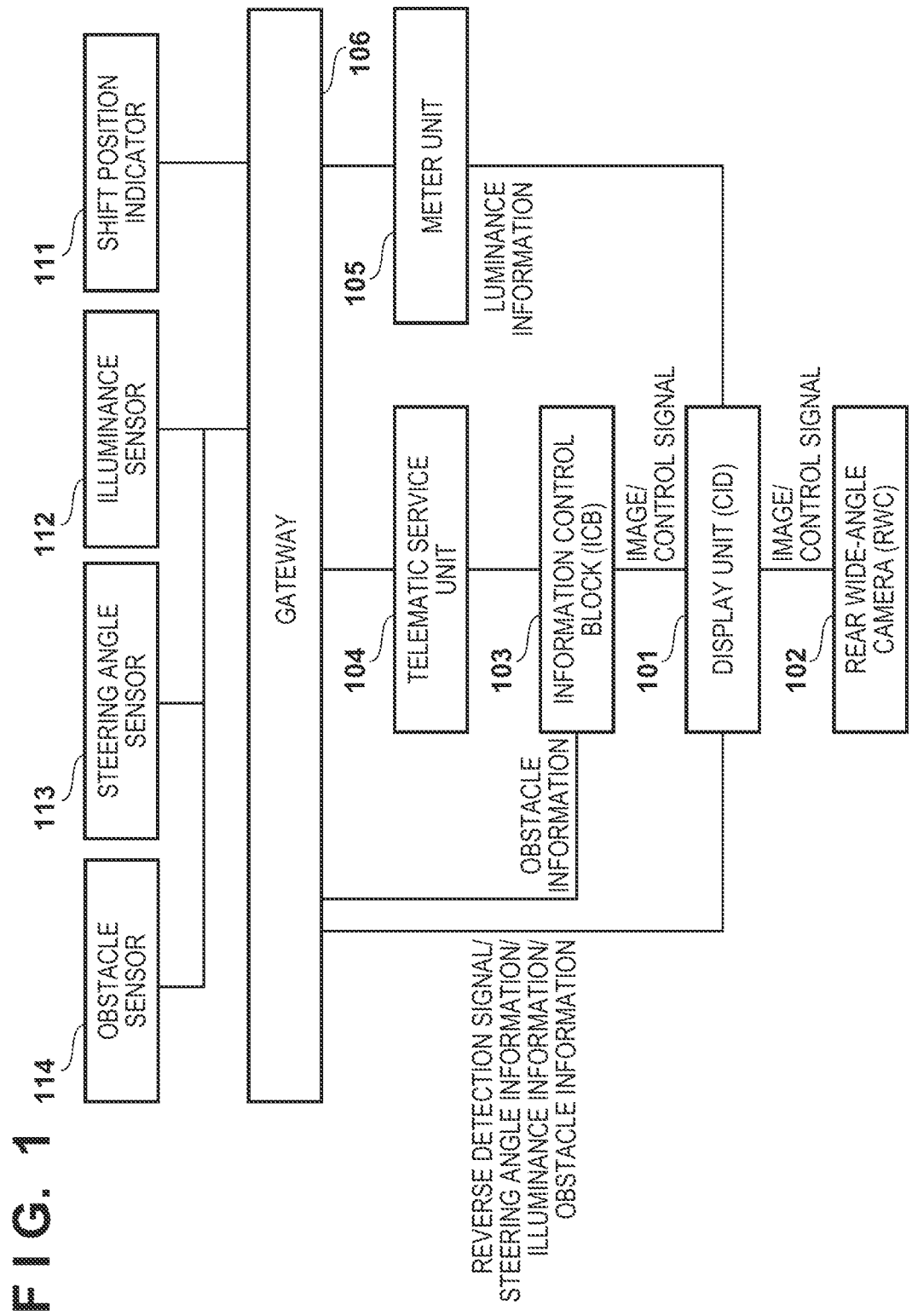
FIG. 1 is a system configuration diagram of an information system of a vehicle including a display unit.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

Vehicle Information System

A vehicle such as a four-wheeled vehicle includes, in addition to a control system that controls a drive system and a steering system, an information system (also referred to as an in-vehicle information system) that provides a user (a driver or the like) with vehicle information and a vehicle outside video in accordance with an instruction from the user. This type of information system includes a user interface that outputs information by display by a display panel, or voice, vibration, or the like, and allows input by a touch panel, mechanical switches, voice, or the like.

FIG. 1 is a block diagram illustrating an example of a configuration of such an in-vehicle information system. Note that this block diagram illustrated parts related to the present application, and parts not particularly related to the present application are not illustrated. In FIG. 1, a gateway 106 connects the control system and the information system. Note that the separation between the control system and the information system is an example, and other separation methods may be employed.

In this example, the control system includes a shift position indicator 111, an illuminance sensor 112, a steering angle sensor 113, and an obstacle sensor 114. The shift position indicator 111 indicates at least a traveling direction of the vehicle specified by the driver. For example, the shift position indicator 111 may be achieved by a switch, a sensor, or the like. The shift position indicator 111 indicates the specified direction regardless of the actual travel of the vehicle. The traveling direction of the vehicle is either forward or backward (reverse). For example, in a case where an instruction of backward movement (reverse) is given, even if traveling in the backward direction is not started, the shift position indicator 111 indicates reverse if a backward operation is performed with a switch, a lever, or the like. In a case where the vehicle has a stepped transmission, the specified stage may be indicated by the shift position indicator 111. Note that the shift position indicator 111 may be displayed on a display unit 101 or a meter unit 105 described later.

The illuminance sensor 112 is provided, for example, in an interior of a vehicle, and detects illuminance at a mounting position thereof. The illuminance sensor 112 of the present embodiment may be provided at or near the meter panel so as to be capable of detecting the illuminance near the meter panel.

The steering angle sensor 113 detects and outputs the angle of a steering wheel by steering operation. Alternatively, the rotation angle of a steering shaft may be detected and output. The obstacle sensor 114 may be, for example, an ultrasonic sensor provided at a front or rear corner portion, a rear portion, a side portion, and the like of the vehicle, and can detect the distance to the object.

The meter unit 105 includes, for example, a display panel such as a liquid crystal display (LCD) or an organic electroluminescence (EL) with adjustable luminance. Alternatively, the meter unit 105 may include an analog meter unit provided with a scale and a pointer, and in this case, the meter unit is provided with an illumination with adjustable luminance for illuminating the meter unit. The meter unit 105 mainly displays a traveling state of the vehicle such as a traveling speed and a remaining amount of fuel or a battery.

An information control block (ICB) 103 is a control unit that controls the in-vehicle information system, and can generate an image to be displayed on the display unit (CID) 101, for example, and transmit the image to the display unit 101 for display. Further, the information control block 103 can acquire obstacle information output from the obstacle sensor 114 and generate an image indicating a distance to the detected object. Furthermore, the information control block 103 can control a connected telematic service unit 104 to perform receiving information from the server, making an outgoing call such as an emergency call, or the like. Further, luminance information indicating luminance of the display panel and luminance of the illumination of the meter unit 105 can be acquired from the meter unit 105. The information control block 103 may be referred to as an information control unit.

A rear wide-angle camera (RWC) 102 is a camera directing rearward at the rear portion of the vehicle, and captures a vehicle outside video behind the vehicle. The rear wide-angle camera 102 of the present embodiment has an adjustable angle of view, and is configured to be switchable to, for example, standard, wide angle, telephoto, or the like in accordance with an instruction from the display unit 101 (or the information control block 103). However, the angle of view of the rear wide-angle camera 102 may be fixed to a wide angle. The rear wide-angle camera 102 starts capturing when its power is turned on, and continues transmitting captured video information to the display unit 101 while the power is on.

A display unit (CID) 101 can display image information received from the information control block 103. Further, a video received from the rear wide-angle camera 102 can also be displayed. Note that, here, the video information is a moving image at a predetermined frame rate, and the image information represents an image corresponding to one frame. Note that, when viewed from the viewpoint of the display unit 101, another unit may be referred to as an external unit or an external device. Further, the information control block 103 may be referred to as a first device, and the image information input from the information control block 103 to the display unit 101 may be referred to as first image information. In addition, the rear wide-angle camera 102 may be referred to as a second device, and the vehicle outside video (or vehicle outside image) from the rear wide-angle camera 102 may be referred to as second image information.

Display Unit

Figure 2:
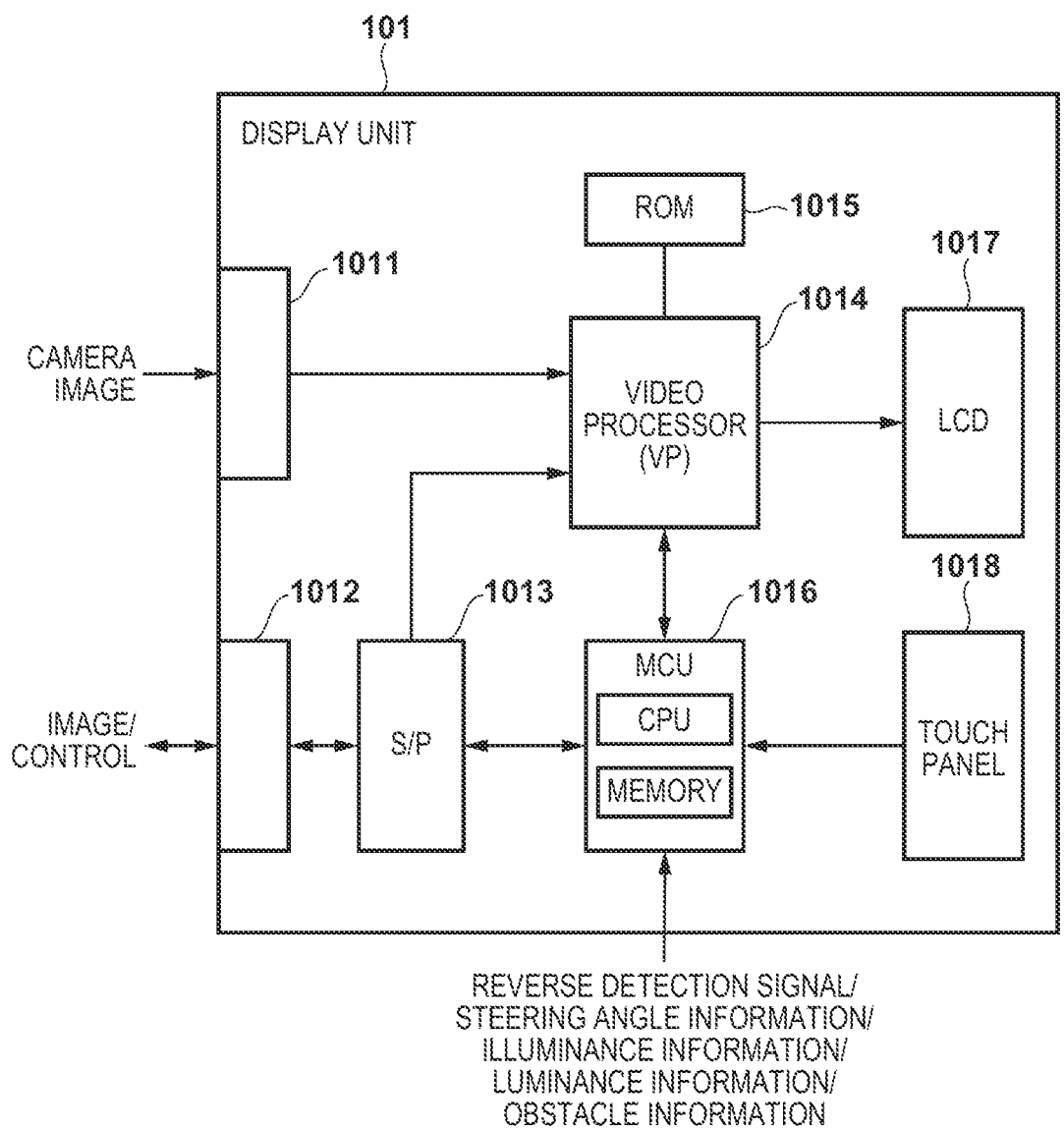
FIG. 2 is a block diagram of the display unit.

FIG. 2 is a block diagram illustrating an example of a configuration of the display unit (CID) 101. Video information (second image information) from the rear wide-angle camera 102 is input to a video processor 1014 through an interface (or also referred to as a second reception unit) 1011. The interface 1011 may perform conversion or the like of the video information, but may be a simple connection unit that does not perform conversion or the like of a signal if not particularly necessary. The image information (first image information) from the information control block 103 is input to the video processor 1014 through an interface (also referred to as a first reception unit) 1012 and a series/parallel converter 1013. However, this is because the display unit 101 is connected to the information control block 103 by communication such as LAN, and the series/parallel converter 1013 does not need to be provided if the display unit 101 and information control block 103 are connected by a parallel bus. The interface 1012 may perform conversion or the like of image information, but may be a simple connection unit that does not perform conversion or the like of a signal if not particularly necessary. In a case where both interfaces are mere connection units, respective input ports of the video processor 1014 may correspond to the first reception unit and the second reception unit.

The video processor (VP) 1014 receives input of image information or video information of two systems, reads image information stored in a ROM 1015, and displays an image on a display part 1017 such as an LCD at a predetermined frame rate. These three input channels are referred to as layers in the present embodiment. A display manner can be changed according to an instruction from a control unit (MCU) 1016. The instruction from the control unit 1016 includes a display setting and a non-display setting for each layer in addition to a display setting and a non-display setting for the entire display part 1017. In a case where a display setting is made for a plurality of layers, images of the layers for which the display setting is made are combined and displayed. Thus, for example, any one of the layers can be displayed, any two or all three layers can be combined and displayed, or a black screen in which none of the layers is displayed can be displayed. In a case where the entire display part 1017 is set to be non-displayed, the entire screen is non-displayed (black screen) even when the display setting for each layer is set. As for the image information acquired from the ROM 1015, the video processor 1014 can acquire image information specified according to an instruction from the control unit 1016. The ROM 1015 may be a rewritable nonvolatile memory.

The control unit (MCU) 1016 includes a CPU and a memory, and executes a programmed procedure by causing the CPU to execute a program stored in the memory. The memory may include an electrically rewritable ROM and a volatile RAM. The control unit 1016 executes the program to control display by the video processor 1014. Thus, the control unit 1016 may be referred to as a display control unit. The control unit 1016 receives, for example, information from the outside, for example, a reverse detection signal, steering angle information, illuminance information, luminance information, and the like, and performs control such as generating an image according to the received information or controlling the luminance of the display part 1017.

Furthermore, the control unit 1016 communicates with the information control block 103 as necessary, transmits a necessary instruction (command), and receives a response. Further, an operation of a touch panel 1018 formed on the LCD surface is received. What is received is, for example, occurrence of a touch event (including a position), or the like.

Display Example

Next, a display example by the information system illustrated in FIGS. 1 and 2, particularly the display unit 101 will be described. FIG. 3 illustrates an example of screen transition in a case where the driver gives a reverse instruction using a shift knob, a switch, or the like to the vehicle in a power-on state. A screen 301 illustrates an example of a screen of normal display. Here, the normal display is a display screen in a case where the reverse instruction is not given, and is a screen displayed by default in a state where the power is turned on and the vehicle is parked, stopped, or moving forward. On the screen 301, for example, buttons 3011 for editing or reflecting user settings individually set for each user, and operation buttons for performing telephone, music reproduction, navigation, and the like are arranged. When the user performs a touch operation on these buttons, the screen is switched to a screen according to the operation. In addition, the user setting includes settings of luminance of the display and the illumination of the meter unit 105, and in a case where the user setting of a specific user is selected and reflected, the user setting is adjusted according to luminance user settings of the display and the illumination of the meter unit 105.

When the driver gives a reverse instruction while the screen 301 or a screen switched from the screen 301 by button operation is displayed, a black screen 302 is temporarily displayed. Note that, although the black screen is a screen on which nothing is displayed, it is expressed here that the black screen is displayed for convenience. The black screen 302 is displayed until a next screen 303 becomes displayable, and a maximum value (upper limit) is set for the time of display thereof. If a requirement for the time until the rear video is displayed after the reverse instruction is defined by law or the like, the maximum value may be determined so as to satisfy the requirement. Alternatively, the maximum value may be a period determined in consideration of the driver's mind or the like. This period is referred to as a first predetermined time or a first predetermined period. Therefore, the duration of the black screen 302 is at most equal to the first predetermined time, but can be shorter than the first predetermined time. The first predetermined time may be, for example, around one second.

After the black screen 302 is displayed for a predetermined time at the maximum, the screen 303 is displayed. The screen 303 includes a region 3031 for displaying an image (referred to as a first image) based on the image information received from the information control block 103, and a region 3032 for displaying an image (referred to as a second image) based on the video information received from the rear wide-angle camera 102. In the drawing, the region 3032 is a region surrounded by a dotted line. The region 3031 is another region. The region 3031 may be referred to as a first display region, and the region 3032 may be referred to as a second display region. The image displayed in the region 3031 is also referred to as an RWC display screen.

In the region 3032, an image 30311 indicating the presence and distance of an object detected by the obstacle sensor 114, a button 30312 for operating the angle of view of the rear wide-angle camera 102, and an adjustment bar 30313 for adjusting luminance are displayed. The image 30311 is a pseudo top view image for warning (or notifying) the driver of an object existing around the vehicle. These images are images generated by the information control block 103, that is, image objects included in the first image. However, if the obstacle sensor 114 is not provided in the vehicle, the image 30311 may be non-displayed. Further, in a case where the angle of view of the rear wide-angle camera 102 is fixed, the button 30312 may be non-displayed. As described above, in a case where the image information can be acquired from the information control block 103 within the first predetermined time, the image is displayed on the display part 1017 simultaneously with the video from the rear wide-angle camera 102.

After a predetermined time (also referred to as a second predetermined time) has elapsed since the display of the screen 303, a screen 401 illustrated in FIG. 4 is displayed. In the image 401, guiding lines 4011 are displayed to be superimposed on the image 303. The guiding lines 4011 are lines indicating a predicted path of the vehicle moving backward by the maximum width of the vehicle or the like, and are guide images (also referred to as a third image) for guiding the driver on the travel path when the vehicle is moving backward. In the example of FIG. 4, a line at the rear end of the vehicle is also displayed in some stages. Although an example of a case of straight traveling is illustrated in the drawing, since the predicted path varies depending on the steering angle, the guiding lines according to the steering angle are selected and combined. The second predetermined time may be a very short time, for example, a time of about one frame. Note that the third image may be displayed simultaneously with the first image and the second image without providing the second predetermined time.

Moreover, in a case where an obstacle is detected on the rear side, a warning image 4012 (also referred to as a fourth image) is combined and displayed on the screen 401 simultaneously with the guiding lines 4011. The range of detection depends on a detection range of the obstacle sensor, but for example, in a case where another vehicle, a pedestrian, or the like behind and beside the vehicle is detected when the vehicle moves backward from a parking lot to a passage, the warning image 4012 is displayed. The warning image 4012 may be displayed according to the direction corresponding to the position of the obstacle. Furthermore, the warning image 4012 may be displayed according to the distance to the obstacle. In the example of FIG. 4, if there is an obstacle on one or both of the left and right sides, a "<" type object in that direction is displayed. In addition, it may be displayed singly or doubly according to the distance. Note that FIG. 4 is a diagram for description, and the obstacle corresponding to the warning image is not displayed on the screen 401, but the detected obstacle is actually displayed in the image 303.

Here, in a case where the black screen 302 is displayed and the image (first image) generated by the information control block 103 cannot be acquired before the first predetermined time elapses in this state, the screen 402 is displayed after the black screen 302. On the screen 402, the video from the rear wide-angle camera 102 is displayed in the second display region, but the first image from the information control block 103 is not displayed in the first display region and remains non-displayed.

Thereafter, when the second predetermined time elapses, if the guiding lines and the obstacle are detected in the camera image, the screen 403 on which the warning image is superimposed is displayed. Note that, when the image generated by the information control block 103 can be acquired in a state where the screen 403 is displayed, the image may be combined and displayed in the first display region at the time of acquisition, but in this example, the screen 403 is left as it is.

As described above, in a case where the reverse instruction is given by the user, a camera image from the rear wide-angle camera 102 is displayed on the display unit 101 within a certain period of time after the reverse instruction is given. Further, accompanying information (pseudo top view image 30311, button 30312, adjustment bar 30313, and the like) associated therewith is displayed along with the camera image at the same time if the image information can be acquired within a certain period of time, but is not displayed if the image information cannot be acquired. Thus, it is possible to improve the visibility by simultaneously displaying the camera image and the accompanying information while guaranteeing the display of an external image of the vehicle within a predetermined time. Furthermore, since the guiding lines and the warning image are superimposed and displayed after the camera image is displayed, the visibility is not impaired.

In order to implement the transition of the display state illustrated in FIGS. 3 and 4, processing procedures by the display unit 101 and the like are illustrated in FIGS. 5 to 8B.

Display Control Processing By Control Unit 1016

Figure 5:
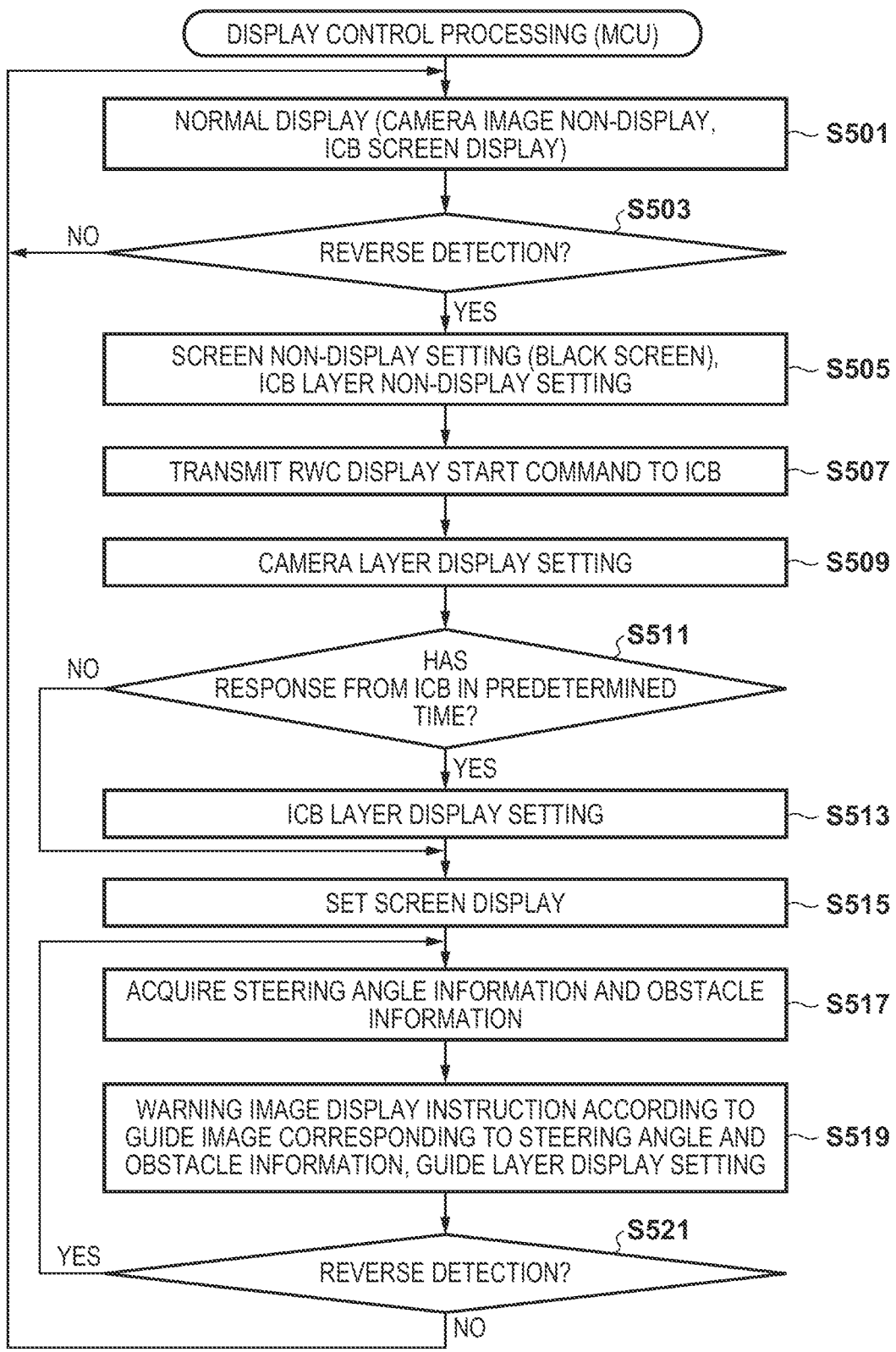
FIG. 5 is a flowchart of a display control procedure by the display unit (MCU)

FIG. 5 illustrates an example of a flowchart of a procedure, that is, a program executed by the control unit 1016 of the display unit 101. This procedure starts from a state in which the power of the vehicle is on and the normal display, that is, the screen 301, is displayed.

First, the normal display is performed (S501). In the normal display, the video from the rear wide-angle camera 102 is non-displayed, and only the image based on the image information from the information control block 103 is displayed. In this state, the reverse instruction, that is, the reverse detection signal is tested (S503). If there is no reverse instruction, S501 is continued. In a case where it is determined that the reverse movement is maintained, the setting of non-display of the entire display part 1017 (screen non-display setting) is output to the video processor 1014. In addition, a layer (referred to as an ICB layer) corresponding to the input of the information control unit 103 is also set to be non-displayed (ICB layer non-display setting) (S505). Thus, a black screen 302 is displayed on the display part 1017.

Thereafter, an RWC display start command is transmitted to the information control block 103 (S507). The RWC display start command is an instruction to the information control block 103 to generate and output an image to be displayed simultaneously with the camera image of the rear wide-angle camera 102. Upon receiving the RWC display start command, the information control block 103 generates and outputs the image to be displayed together with the camera image of the rear wide-angle camera 102, and returns a response. The operation will be described later with reference to FIG. 7.

Subsequently, display setting of a layer (referred to as a camera layer) of the video input from the rear wide-angle camera 102 is performed on the video processor 1014 (S509). However, since the screen non-display setting is set at this time point, the image from the rear wide-angle camera 102, which is the input of the camera layer, is not yet displayed and the black screen 302 remains. Thereafter, the control unit 1016 waits for a response from the information control block 103 for a predetermined time (first predetermined time) (S511).

In a case where there is a response within the predetermined time, the display setting of the ICB layer is output to the video processor 1014 (S513). Here, at the time of receiving the response from the information control block 103, the display unit 101 has received the input of the image information from the information control block 103. Therefore, when S513 is executed, the video processor 1014 tries to combine and output the camera image of the camera layer and the image of the ICB layer.

On the other hand, if the response has not been received within the predetermined time in step S511, step S513 is skipped and the process branches to step S515. In this case, the video processor 1014 attempts to output only the camera image of the camera layer.

Next, the control unit 1016 outputs a screen display setting to the video processor 1014 (S515). In response to this, the image of the layer set for display is displayed on the display part 1017. If step S513 has been executed, the image 303 in which the camera image of the camera layer and the image of the ICB layer are combined is displayed, or if step S513 has not been executed, the image 402 of the camera image is displayed.

The control unit 1016 acquires the steering angle information from the steering angle sensor 113 and acquires the obstacle information from the obstacle sensor 114 (S517). Then, the instruction of the guide image according to the steering angle information and the display setting of the layer (referred to as an overlay layer) of the image information from the ROM 1015 are output to the video processor 1014 (S519). At this time, if the obstacle information indicates the presence and position of an obstacle, output of a warning image corresponding to the position is also instructed. The guide image according to the steering angle information is stored in the ROM 1015 in advance and may be indexed. The control unit 1016 can give an instruction to display the guide image according to the steering angle information by specifying, in the video processor 1014, the index according to the steering angle as the image information to be displayed together with the display setting of the overlay layer. Similarly, the warning image corresponding to the position and distance of the obstacle may be stored in the ROM 1015 in advance and may be indexed. The control unit 1016 can give an instruction to display the warning image corresponding to the obstacle information by specifying, in the video processor 1014, the index corresponding to the position and distance of the obstacle as the image information to be displayed together with the guiding lines. Since the screen display setting has already been performed at the time of step S519, the video processor 1014 displays the screen 401 or the screen 403 in which the guiding lines according to the steering angle and the warning image according to the obstacle information are superimposed on the camera image according to the instruction. Note that, in a case of the vehicle not including the obstacle sensor 114, the obstacle information is not acquired in step S517, and in this case, the processing is only required to be executed assuming that no obstacle is detected in step S519.

In step S521, similarly to step S503, a reverse signal is tested (S521), steering angle information is acquired as long as the reverse signal is detected, and the guiding image corresponding to the acquired steering angle is updated. When the reverse signal is not detected, the process branches to step S501 to repeat the processing.

Display Control Processing By Video Processor 1014

Figure 6:
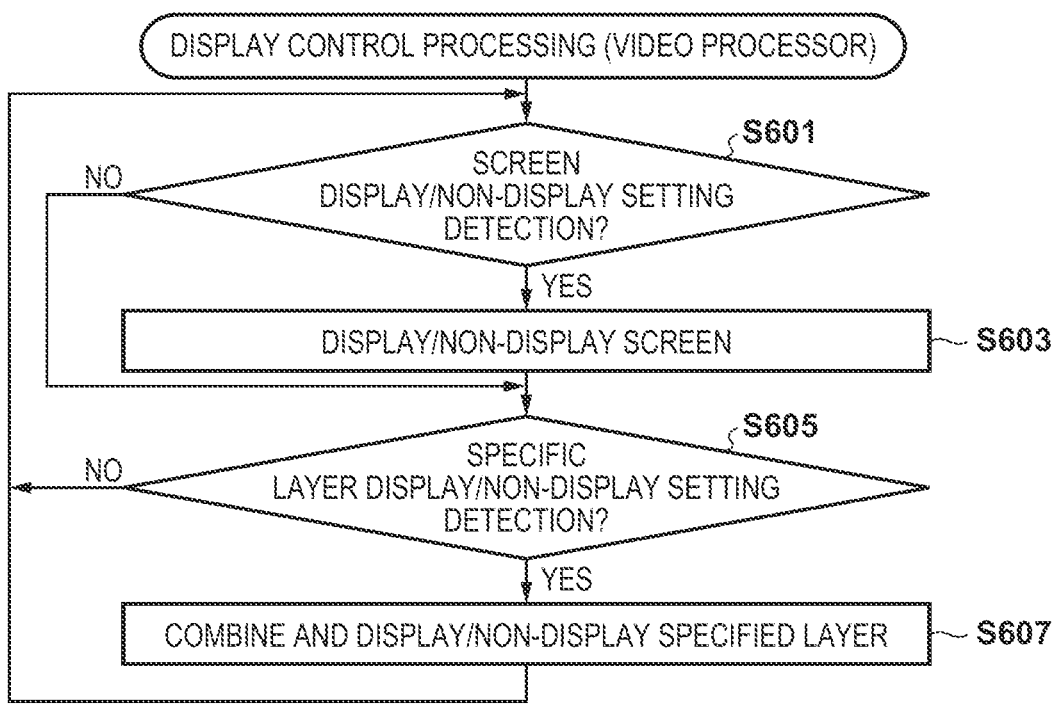
FIG. 6 is a flowchart of a display control procedure by the display unit (VP)

FIG. 6 illustrates a flowchart of display control processing by the video processor 1014. The video processor 1014 controls screen display on the display part 1017 according to an instruction from the control unit 1016 and an input of each layer.

Upon receiving the instruction from the control unit 1016, the video processor 1014 determines whether the received instruction is the screen display setting or the screen non-display setting (S601). If either of the settings is applicable, screen display is performed in a case of the screen display setting, and screen non-display is performed in a case of the screen non-display setting, in response to the instruction (S603). As described above, what is displayed is a combined image of the layers set for display.

Next, the video processor 1014 determines whether the instruction received from the control unit 1016 is the screen display setting or the screen non-display setting of a specific layer (S605). When any of the cases is applicable, images of layers set to the display setting are combined and displayed on the screen in a case of display setting of layers according to the instruction. On the other hand, in a case of the non-display setting of a layer, the image of a specified layer is set to be non-displayed (S607). When display setting of other layers is set, the image of the layer for which an instruction of non-display is given is excluded from combination targets, and the screen is displayed. As described above, if the screen display setting is not set, display is not performed regardless of the display setting of layers.

Image Generation Processing by Information Control Block 103

Figure 7:
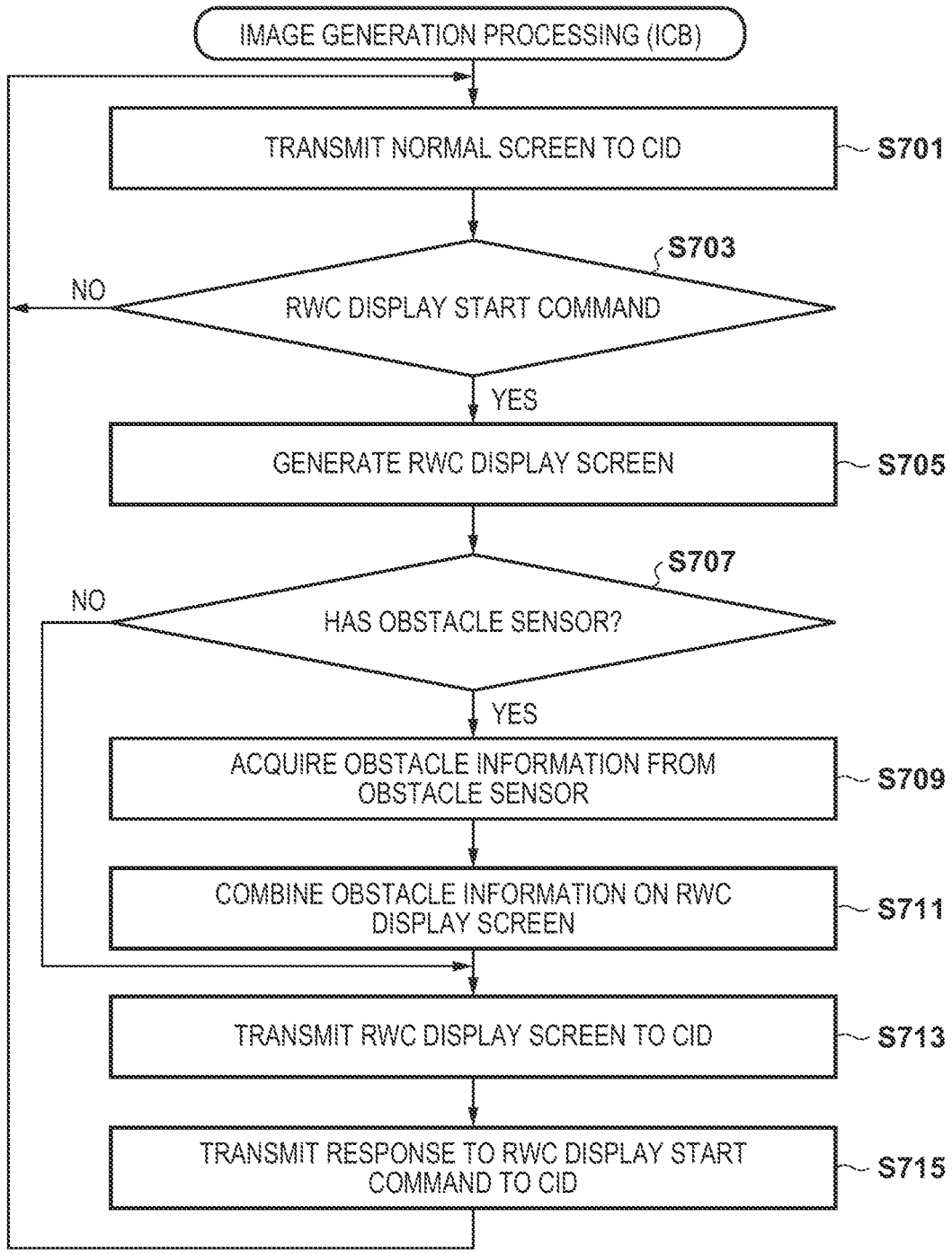
FIG. 7 is a flowchart of screen generation processing by an information control block.

FIG. 7 is a flowchart of image generation processing by the information control block 103. In the normal state where the reverse instruction is not given, the normal screen is transmitted to the display unit (CID) 101 (S701). Note that the image information received by the display unit 101 may be stored instead of being continuously transmitted by the information control block 103, and the stored image information may be used as an input of the ICB layer until the image information is updated.

The information control block 103 determines whether an RWC display start command has been received from the control unit 1016 of the display unit 101 (S703). When the RWC display screen has been received, the RWC display screen is generated (S705). The RWC display screen is a screen displayed in the display region 301 of the screen 303. At this stage, the RWC display screen includes the button 30312 for operating the angle of view of the rear wide-angle camera 102 and the adjustment bar 30313 for adjusting luminance. Since the RWC display screen is assumed to be combined with the camera image, the RWC display screen is generated according to a method of combination so as not to impair the camera image. For example, in a case of performing the combination by simply adding each pixel, pixel values of the region corresponding to the region 3032 of the camera image on the RWC display screen are set to zero. In a case where the camera image is overwritten on the fixed region 3032, the content of the region corresponding to the region 3032 may be any content.

Next, the pseudo top view image 30311 indicating the presence and distance of the object detected by the obstacle sensor 114 is further combined with the RWC display image. For this purpose, first, it is determined whether the obstacle sensor is provided in the vehicle on which the information system is mounted (S707). This determination may be made by testing the contents of the obstacle information or by referring to setting information indicating the presence or absence of an obstacle sensor. In a case where it is determined that the obstacle sensor 114 is present, obstacle information from the obstacle sensor 114 is acquired (S709). Further, the obstacle information is combined with the RWC display screen on the basis of the acquired obstacle information (S711). The obstacle information to be combined may be an image illustrated on the screen 303 and exemplified by the pseudo top view image 30311 indicating the presence and distance of the object detected by the obstacle sensor 114. On the other hand, if it is determined that the obstacle sensor 114 is not present, steps S709 and S711 are skipped.

Next, image information of the generated RWC display screen is transmitted to the display unit 101 (S713). Finally, a response to the RWC display start command is transmitted to the display unit 101 (S715). Thereafter, the process returns to step S701. If the RWC display start command has not been received in step S703, step S701 is continued.

According to the above procedure, in a case where the reverse instruction is given by the user, the camera image from the rear wide-angle camera 102 is displayed on the display unit 101 within a certain period of time after the reverse instruction is given. Further, accompanying information (pseudo top view image 30311, button 30312, adjustment bar 30313, and the like) associated therewith is displayed along with the camera image at the same time if image information thereof can be acquired within a certain period of time, but is not displayed if the image information cannot be acquired. Thus, it is possible to improve the visibility by simultaneously displaying the camera image and the accompanying information while guaranteeing the display of an external image of the vehicle within a predetermined time. Furthermore, since the guiding lines (and the warning image if necessary) are superimposed and displayed after the camera image is displayed, the visibility is not impaired.

Luminance Adjustment Processing

Figure 8A:
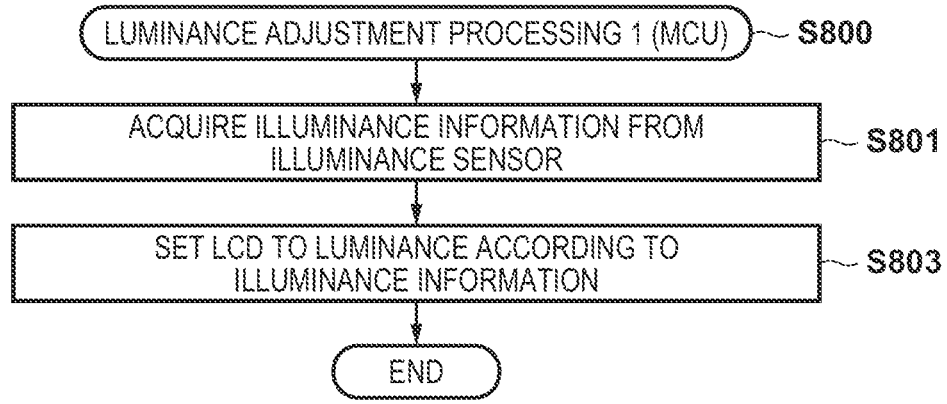
FIGS. 8A and 8B are flowcharts of luminance adjustment processing by the display unit (MCU).
Figure 8B:
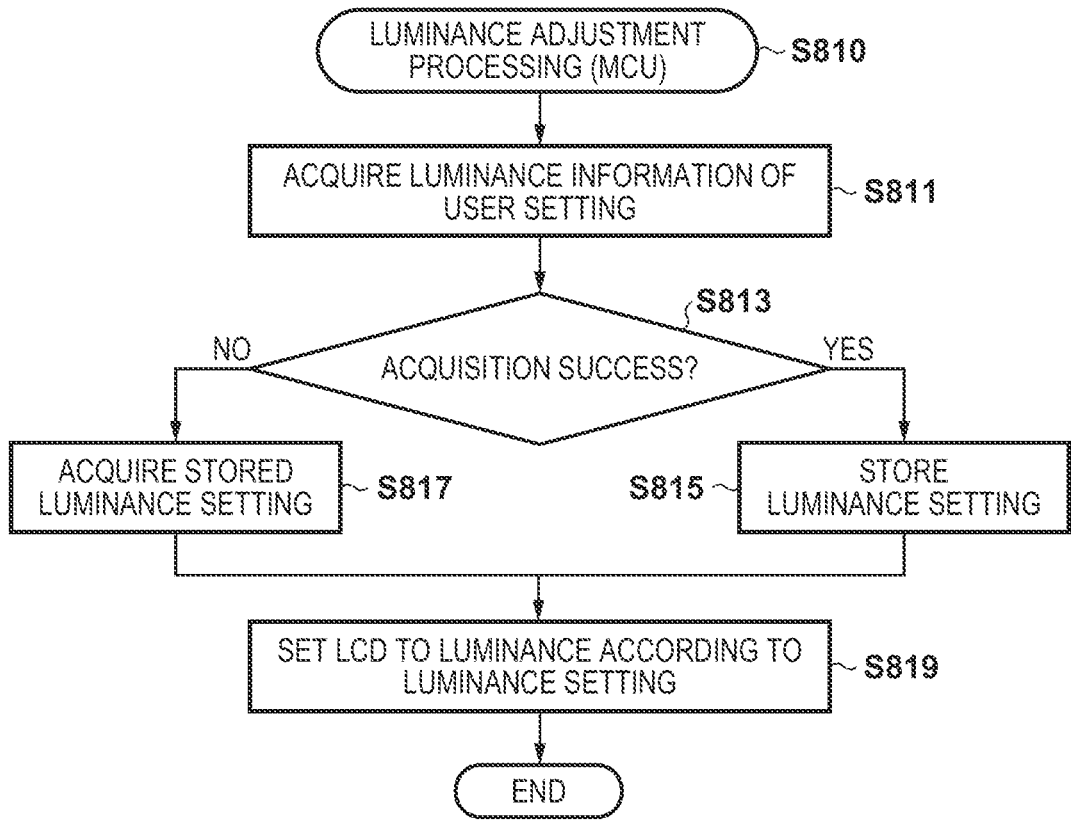

FIGS. 8A and 8B are flowcharts of processing of luminance adjustment of the display part 1017 by the control unit 1016. A flow 800 of FIG. 8A is an example thereof and a flow 810 of FIG. 8B is another example, and these flows may be switched and applied. If the user setting has been performed, the flow 810 may be applied, or if not, the flow 800 may be applied.

In the flow 800, the control unit 1016 acquires detected illuminance information from the illuminance sensor 112 (S801). Next, the control unit 1016 sets luminance according to the acquired illuminance information in the display part (LCD) 1017 (S803). When the detected illuminance is high, the ambient light is strong, and the luminance is set to be high. Note that the relationship between the illuminance and the luminance may be specified from, for example, a predetermined correspondence relationship, for example, a table or a mathematical expression, so as to set the luminance. The flow 800 may be periodically executed, for example, at predetermined time intervals. By this procedure, the luminance of the display part can be set to the luminance according to the illuminance of the environment, and the visibility is further improved. Note that, instead of acquiring the illuminance information, for example, the luminance of the display set in the meter unit 105 may be acquired, and the luminance of the display part 1017 may be set correspondingly.

In the flow 810, the control unit 1016 acquires the luminance information of the user setting (S811). The luminance information of the user setting can be acquired from the information control block 103, the meter unit 105, or the like. Next, the control unit 1016 determines whether the acquisition has succeeded (S813). For example, in a case where there is no electrical connection, or the like, when the acquisition request times out, it can be determined that the connection has failed. In a case where the acquisition has succeeded, the acquired luminance setting is stored in the memory or the like (S815). At this time, the acquired luminance setting may not be associated with the user. On the other hand, in a case where the acquisition fails, the luminance setting saved by execution of the previous flow 810 is acquired (S817). In preparation for a case where step S815 has never been executed, an appropriate luminance setting may be stored as a default during initialization processing. Finally, the luminance of the display part (LCD) 1017 is set to the luminance according to the acquired luminance setting (S819).

The user setting is a set of setting values set for each user of the vehicle, and the setting of the luminance of the display part 1017 may be included therein. The flow 810 is executed by the user applying the user setting associated with the user, such as when driving the vehicle. Thus, the flow 810 is only required to be executed when the user setting is selected or when the vehicle is powered on. By this procedure, even when the luminance setting of the display part included in the user setting cannot be acquired, the previously set luminance can be set. Since the luminance setting that has already been set is applied, even in such a case, setting of appropriate luminance can be expected, and the visibility is further improved.

Other Examples

The present invention can be implemented by processing of supplying a program for implementing one or more functions of the above-described embodiments to a system or apparatus via a network or storage medium, and causing one or more processors in the computer of the system or apparatus to read out and execute the program. The present invention can also be implemented by a circuit (for example, an ASIC) for implementing one or more functions.

Summary of Embodiments

To summarize the above embodiments, a display device, a control method thereof, and a program described below are disclosed in the present specification.

1. Provided is a display device mounted on a vehicle, the display device comprising:
   a first receiver that receives first image information generated by a first device;
   a second receiver that receives, from a second device, second image information that is image information of a vehicle outside image;
   a display that displays an image based on image information;
   at least one processor; and
   at least one memory that stores at least one program, wherein
   the display includes a first display region that displays a first image based on the first image information received by the first receiver in response to detection of a request for display of a vehicle outside image, and a second display region that displays a second image based on the second image information received by the second receiver and
   the at least one program causes the at least one processor to
   simultaneously display the first image and the second image in a case where the first image information is received within a predetermined time after the second image information is received, or display the second image in a case where the first image information is not received even when the predetermined time elapses.

With this configuration, even if the first device is out of order or the processing load of the first device is heavy, the image outside the vehicle can be reliably displayed within a predetermined time after the request is made. Furthermore, when the first device is in a normal state or the processing load of the first device is small, then the first and second images are displayed at the same time, thereby the visibility of the user can be improved.

2. The display device according to article 1, wherein
   the at least one program further causes the at least one processor to display a black screen on a display part for the predetermined time after the second image information is received.

With this configuration, it is possible to explicitly indicate to the user that the display will be switched. At the same time, it is possible to reduce a sense of discomfort when only the camera image is displayed when the first display area cannot be displayed due to a failure or a heavy processing load of the first device.

3. The display device according to article 1, wherein
   the at least one program causes the at least one processor to further display, in response to detection of the request for display of the vehicle outside image, a third image including a guide image of a travel path based on steering angle information acquired by a steering angle information acquisition unit on the display in a superimposed manner on the second image after the second image is displayed.

With this configuration, it is possible to prevent the guiding line from being displayed before the camera image and improve the visibility.

4. The display device according to article 1, wherein
   the at least one program causes the at least one processor to further display, in response to detection of the request for display of the vehicle outside image, a fourth image for warning of an object existing around the vehicle based on detection information of the object existing around the vehicle acquired by an obstacle information detection unit in a superimposed manner on the second image after the second image is displayed.

With this configuration, a warning image showing an object around the vehicle can be displayed together with an image outside the vehicle.

5. The display device according to article 1, further comprising
   an illumination information acquisition unit that acquires luminance information or illuminance information of an illumination mounted on the vehicle from an in-vehicle device other than the first device, wherein
   the at least one program causes the at least one processor to further adjust luminance of the display on a basis of information acquired by the illumination information acquisition unit.

With this configuration, even if the first device fails, the brightness of the second image can be controlled, thus the visibility is improved, and the safety is improved.

6. The display device according to article 1, wherein
   the at least one program further causes the at least one processor to
   acquire luminance information of a user setting from the first device and store the luminance information in a storage unit, and adjust, when it is not possible to receive the luminance information of the user setting from the first device, luminance of a display part on a basis of the luminance information stored in the storage unit.

With this configuration, even when luminance information included in the user-settings cannot be acquired from the first device, the luminance of the display can be adjusted based on the saved user settings, and the visibility is improved and thus the safety can be improved.

7. The display device according to article 1, wherein
the second device is a camera directing rearward at a rear portion of the vehicle, and
the request for display of the vehicle outside image is a reverse signal indicating that an instruction of reverse movement of the vehicle has been given.

With this configuration, the rear visibility at the time of backing away is improved, and safety can be improved.

8. A control method for a display device mounted on a vehicle, wherein
the display device includes a display including a first display region that displays a first image based on first image information received by a first receiver in response to detection of a request for display of a vehicle outside image, and a second display region that displays a second image based on second image information received by a second receiver, and
the control method comprises:
receiving first image information generated by a first device;
receiving, from a second device, second image information that is image information of a vehicle outside image; and
simultaneously displaying the first image and the second image in a case where the first image information is received within a predetermined time after the second image information is received, and displaying the second image in a case where the first image information is not received even when the predetermined time elapses.

With this configuration, it is possible to explicitly indicate to the user that the display will be switched. At the same time, it is possible to reduce a sense of discomfort when only the camera image is displayed when the first display area cannot be displayed due to a failure or a heavy processing load of the first device.

9. A non-transitory computer-readable medium storing a program, wherein when the program is executed by a computer including
a display including a first display region that displays a first image based on first image information received by a first receiver in response to detection of a request for display of a vehicle outside image, and a second display region that displays a second image based on second image information received by a second receiver, the program causes the computer to
receive first image information generated by a first device,
receive, from a second device, second image information that is image information of a vehicle outside image,
simultaneously display the first image and the second image in a case where the first image information is received within a predetermined time after the second image information is received, and
display the second image in a case where the first image information is not received even when the predetermined time elapses.

With this configuration, it is possible to explicitly indicate to the user that the display will be switched. At the same time, it is possible to reduce a sense of discomfort when only the camera image is displayed when the first display area cannot be displayed due to a failure or a heavy processing load of the first device.

The invention is not limited to the foregoing embodiments, and various variations/changes are possible within the spirit of the invention.

What is claimed is:

1. A display device mounted on a vehicle, the display device comprising:
a first receiver that receives first image information generated by a first device;
a second receiver that receives, from a second device, second image information that is image information of a vehicle outside image;
a display that displays an image based on image information;
at least one processor; and
at least one memory that stores at least one program, wherein
the display includes a first display region that displays a first image based on the first image information received by the first receiver in response to detection of a request for display of a vehicle outside image, and a second display region that displays a second image based on the second image information received by the second receiver and
the at least one program causes the at least one processor to
wait for the first image information for a predetermined time after the second image information is received, and
simultaneously display the first image and the second image in a case where the first image information is received within the predetermined time, and display the second image prior to the first image in a case where the first image information is not received even when the predetermined time elapses.

2. The display device according to claim 1, wherein
the at least one program further causes the at least one processor to display a black screen on a display part for the predetermined time after the second image information is received.

3. The display device according to claim 1, wherein
the at least one program causes the at least one processor to further display, in response to detection of the request for display of the vehicle outside image, a third image including a guide image of a travel path based on steering angle information acquired by a steering angle information acquisition unit on the display in a superimposed manner on the second image after the second image is displayed.

4. The display device according to claim 1, wherein
the at least one program causes the at least one processor to further display, in response to detection of the request for display of the vehicle outside image, a fourth image for warning of an object existing around the vehicle based on detection information of the object existing around the vehicle acquired by an obstacle information detection unit in a superimposed manner on the second image after the second image is displayed.

5. The display device according to claim 1, further comprising
an illumination information acquisition unit that acquires luminance information or illuminance information of an illumination mounted on the vehicle from an in-vehicle device other than the first device, wherein the at least one program causes the at least one processor to further adjust luminance of the display on a basis of information acquired by the illumination information acquisition unit.

6. The display device according to claim 1, wherein the at least one program further causes the at least one processor to acquire luminance information of a user setting from the first device and store the luminance information in a storage unit, and adjust, when it is not possible to receive the luminance information of the user setting from the first device, luminance of a display part on a basis of the luminance information stored in the storage unit.

7. The display device according to claim 1, wherein the second device is a camera directing rearward at a rear portion of the vehicle, and the request for display of the vehicle outside image is a reverse signal indicating that an instruction of reverse movement of the vehicle has been given.

8. A control method for a display device mounted on a vehicle, wherein the display device includes a display including a first display region that displays a first image based on first image information received by a first receiver in response to detection of a request for display of a vehicle outside image, and a second display region that displays a second image based on second image information received by a second receiver, and the control method comprises:

receiving first image information generated by a first device;

receiving, from a second device, second image information that is image information of a vehicle outside image;

waiting for the first image information for a predetermined time after the second image information is received;

simultaneously displaying the first image and the second image in a case where the first image information is received within the predetermined time, and displaying the second image prior to the first image in a case where the first image information is not received even when the predetermined time elapses.

9. A non-transitory computer-readable medium storing a program, wherein when the program is executed by a computer including a display including a first display region that displays a first image based on first image information received by a first receiver in response to detection of a request for display of a vehicle outside image, and a second display region that displays a second image based on second image information received by a second receiver, the program causes the computer to receive first image information generated by a first device, receive, from a second device, second image information that is image information of a vehicle outside image, wait for the first image information for a predetermined time after the second image information is received, simultaneously display the first image and the second image in a case where the first image information is received within the predetermined time, and display the second image prior to the first image in a case where the first image information is not received even when the predetermined time elapses.

* * * * *